(12) United States Patent
Ouchi

(10) Patent No.: US 7,425,286 B2
(45) Date of Patent: Sep. 16, 2008

(54) METHOD OF MAKING OPTICAL WAVEGUIDE APPARATUS

(75) Inventor: Toshihiko Ouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/246,111

(22) Filed: Oct. 11, 2005

(65) Prior Publication Data
US 2006/0029326 A1  Feb. 9, 2006

Related U.S. Application Data

(62) Division of application No. 10/388,431, filed on Mar. 17, 2003, now Pat. No. 6,980,721.

(30) Foreign Application Priority Data
Mar. 25, 2002  (JP) ............... 2002-082295

(51) Int. Cl.
B29D 11/00  (2006.01)
(52) U.S. Cl. .................. 264/1.24; 205/78; 205/79; 264/1.7; 264/1.9
(58) Field of Classification Search .............. 264/1.1, 264/1.7, 272.11, 272.17, 1.24, 1.9, 1.36; 205/78, 79
See application file for complete search history.

(56) References Cited

U.S. PATENT DOCUMENTS

| | | | |
|---|---|---|---|
| 3,777,154 A | 12/1973 | Lindsey | 250/227 |
| 4,151,582 A | 4/1979 | Grunberger | 362/31 |
| 5,191,219 A | 3/1993 | Linke | 250/551 |
| 5,198,008 A | 3/1993 | Thomas | 385/310 |
| 5,600,741 A | 2/1997 | Hauer et al. | 385/35 |
| 6,324,313 B1 | 11/2001 | Allman et al. | 385/14 |
| 6,408,121 B1 | 6/2002 | Goto | 385/129 |
| 6,450,699 B1 | 9/2002 | Murali et al. | 355/88 |
| 6,455,878 B1 | 9/2002 | Bhat et al. | 257/99 |
| 6,832,031 B2 | 12/2004 | Smaglinski | 385/47 |
| 6,839,476 B2 | 1/2005 | Kim et al. | 385/14 |
| 6,868,214 B1 * | 3/2005 | Sakata et al. | 385/129 |
| 2002/0109074 A1 | 8/2002 | Uchida | 250/214.1 |
| 2002/0167013 A1 | 11/2002 | Iwasaki et al. | 257/79 |

(Continued)

FOREIGN PATENT DOCUMENTS

EP  1 020 749 A1  7/2000

(Continued)

OTHER PUBLICATIONS

L. Balliet et al., "Optical Transmission for Interconnecting Electronic Units," *IBM Technical Disclosure Bulletin*, vol. 26, No. 4, Sep. 1983, pp. 1793-1796.

*Primary Examiner*—Mathieu D. Vargot
(74) *Attorney, Agent, or Firm*—Fitzpatrick, Cella, Harper & Scinto

(57) ABSTRACT

An optical waveguide apparatus includes an optical waveguide, such as an optical sheet of a two-dimensional slab waveguide, and an appropriately-shaped plated structure provided in the optical waveguide. Typically, the plated structure is constructed so as to serve as an optical-path converting unit for optically coupling the optical waveguide and an optical device, which is to be provided on or in the vicinity of the optical waveguide, or as at least a part of a via penetrating the optical waveguide.

4 Claims, 12 Drawing Sheets

U.S. PATENT DOCUMENTS

| | | | |
|---|---|---|---|
| 2003/0039455 A1 * | 2/2003 | Ouchi | 385/88 |
| 2003/0152354 A1 | 8/2003 | Uchida | 385/129 |
| 2004/0114854 A1 | 6/2004 | Ouchi | 385/14 |

FOREIGN PATENT DOCUMENTS

| | | | |
|---|---|---|---|
| JP | 9-270751 | | 10/1997 |
| JP | 10-142438 | * | 5/1998 |
| JP | 2000-235127 | * | 8/2000 |
| JP | 2002-277694 | | 9/2002 |
| WO | WO 99/17143 A1 | | 4/1999 |

* cited by examiner

METHOD OF MAKING OPTICAL WAVEGUIDE APPARATUS

This application is a division of application Ser. No. 10/388,431, filed Mar. 17, 2003, which is based on Japanese Patent Application No. 2002-82295, filed Mar. 25, 2002. The entire disclosures of these applications are incorporated herein by reference.

BACKGROUND OF THE INVENTION

1. Field of the Invention

The present invention relates to an optical waveguide apparatus that includes an optical waveguide, such as an optical waveguide sheet, apparatuses using the optical waveguide apparatus, and a method for making the optical waveguide apparatus. As disclosed herein, the optical waveguide sheet or the optical sheet is a waveguide that permits, for example, an optical transmission from a light-transmitting unit that is not directed at a light-receiving unit, as well as an optical transmission from the light-transmitting unit to the light-receiving unit.

2. Description of the Related Background Art

In recent years, performance of portable equipment, such as personal computers, cellular phones and personal digital assistants (PDAs), and digital audio-visual devices, significantly improved. Different means for interconnecting this equipment are being developed using all kinds of frequency bands in both wireless and wire forms. Therefore, appropriate and prompt ways are needed to cope with malfunctions of digital equipment due to electromagnetic interference from electrical substrates (electromagnetic interference: EMI), external electrical waves (resistance), and signal errors resulting from defective connections (signal integrity (SI)). In view of these electromagnetic wave problems, products prior to shipment are required to meet the standards prescribed by the Radio Law. Development costs for taking these measures continuously increase. In this situation, the optical wiring or interconnection without any electromagnetic induction is expected to radically solve the above regulatory and technical problems.

Further, in the near future, high-speed interconnections will undoubtedly be incorporated into homes. Hence, there is a need to prevent the malfunctions and noise intervention even when high-speed electronic equipment is freely connected in a variety of ground environments. Also, in this respect, the optical interconnection is an effective means that can readily achieve an electrical isolation from the ground.

Various methods for the optical interconnections have been proposed. FIG. 1 illustrates an optical wiring structure 1100 disclosed in Japanese Patent Application Laid-Open No. 9(1997)-270751. In FIG. 1, reference numeral 1120 designates an electrical circuit board. Reference numeral 1130 designates an emitting end of optical signals S1, S2 and S3. Reference numeral 1133 designates an optical-signal input portion. Reference numeral 1101 designates an optical bus (optical sheet). Reference numeral 1134 designates an optical-signal output portion. Reference numeral 1140 designates a receiving end of optical signals S1, S2 and S3. Optical devices 1132 and 1142 driven by driver circuits 1131 and 1141 are mounted at the output and input ports 1130 and 1140, respectively. The optical device 1132 is optically coupled to the optical sheet 1101 through a 45-degree mirror (optical-path converting unit) 1133s.

In the structure of FIG. 1, the positioning or alignment between the optical device 1132 and the optical bus (optical sheet) 1101, more specifically, between the optical device 1132 and the mirror 1133s, is critically important in coupling light from the optical device 1132 to the optical bus 1101.

SUMMARY OF THE INVENTION

It is an object of the present invention to provide an optical waveguide apparatus that includes an appropriately-shaped plated structure for, for example, facilitating an alignment between an optical device and an optical waveguide, such as an optical waveguide sheet, apparatuses including the optical waveguide apparatus, and a method for making the optical waveguide apparatus.

According to one aspect of the present invention, there is provided an optical waveguide apparatus that includes an optical waveguide and an appropriately-shaped plated structure provided in the optical waveguide. Typically, the plated structure is constructed so as to serve as an optical-path converting unit for optically coupling the optical waveguide, such as an optical sheet of a two-dimensional slab waveguide, and an optical device provided on or in the vicinity of the optical waveguide, as at least a part of a via penetrating the optical waveguide, as both a via and an optical path converting unit, or as an optical path converting unit for changing a direction or conditions of light propagating in the waveguide.

The following more specific structures are possible. The plated structure can be encased in the optical waveguide. The plated structure can have an approximately semispherical shape, an approximately horizontal semicylindrical shape, or an approximately horizontal semicylindrical shape having a concave surface on its recessed portion. A patterned metal usable for driving the optical device, and/or a patterned metal for electrical wiring can be further provided on the waveguide. The plated structure can have an approximately semispherical shape such that light emitted from a light-emitting device is reflected by the plated structure in all directions in the optical sheet to perform an optical transmission in the optical waveguide sheet in a broadcasting manner. The plated structure can have an approximately semispherical shape such that light propagating from any direction in the optical sheet is reflected by the plated structure toward a light-receiving device to be received thereby. The plated structure can have an approximately horizontal semicylindrical shape, or an approximately horizontal semicylindrical shape having a concave surface on its recessed portion such that light emitted from a light-emitting device is reflected by the plated structure in a set (predetermined) direction in the optical sheet to perform an optical transmission in the optical waveguide sheet in a set region. The plated structure can have an approximately horizontal semicylindrical shape, or an approximately horizontal semicylindrical shape having a concave surface on its recessed portion such that light propagating from a set direction in the optical sheet is reflected by the plated structure toward a light-receiving device to be received thereby. The optical sheet can include a line-shaped or linear waveguide for performing an optical transmission and reception along a set channel independent from another optical transmission and reception in the optical sheet. The optical waveguide apparatus can further include an optical device (light-emitting device or light-receiving device) provided on the optical waveguide. The plated structure can be located immediately below the optical device.

According to another aspect of the present invention, there is provided an optoelectrical mixture wiring apparatus that includes an electrical circuit substrate including a plurality of electronic devices and electrical wires for connecting the electronic devices to each other; and an optical circuit including: (a) a light-emitting device for converting an electrical signal from an electronic device into an optical signal, (b) the above-discussed optical waveguide apparatus of the present invention, and (c) a light-receiving device for converting an optical signal transmitted in the waveguide into an electrical signal. In the optoelectrical mixture wiring apparatus, the optical waveguide apparatus can be flexible so that it is approximately tightly stacked on the electrical circuit substrate. Further, at least one electrical circuit board and at least one optical circuit can be layered, and the optical waveguide apparatus can include a via for electrical wiring provided in the optical waveguide.

According to yet another aspect of the present invention, there is provided a high-speed optical serial bus in which a plurality of the optical waveguide apparatuses are layered, arranged in a lateral direction, or constructed in their combination form so as to connect multiple-bit wiring between electrical chips, such as CPUs and memories, and/or connect peripheral equipment, such as storing apparatuses or visual instruments.

According to still yet another aspect of the present invention, there is provided a method for making an optical waveguide apparatus, which includes an optical waveguide and a plated structure provided in the optical waveguide, having an appropriate shape, such as an approximately semispherical shape, an approximately horizontal semicylindrical shape, or an approximately semicylindrical shape with a concave surface on its recessed portion. The fabrication method includes a step of forming an electrode on a substrate, a step of patterning an electrode-exposing window having a set shape on the electrode, a step of selectively plating only on and around the window, and a step of coating the patterned and plated surface with a liquefied resin material. The window can have an approximately circular shape, an approximately rectangular shape, or an approximately rectangular shape with long sides each having a recessed central portion, whose diameter (or short side) and thickness are less than about a tenth of those of the plated structure. The electrode-exposing window is made sufficiently small in such a way that the plated structure can have a sufficiently upward-rising profile. The production method can further include a step of drying the resin material and a step of removing the substrate from the dried resin material to obtain the plated structure encased in the resin material. Alternately, in the fabrication method, the substrate can be an electrical circuit substrate, and the plated structure can be formed directly on the electrical circuit substrate such that an optoelectrical mixture substrate with the encasing resin material and electrical circuit substrate can be obtained.

More specifically, a protrusion of the optical-path converting unit or the like can be formed on the substrate (or cladding layer) by plating Ni, Sn, Cr, Cu, Au or the like, and a transparent resin of a waveguide core layer can be formed on the substrate or cladding layer by dipping, casting, spin-coating, or the like. Also, another cladding layer can be formed on the core layer, and a guide hole for mounting an optical device can be formed by photography and etching, molding, laser-beam processing, or the like. Further, an electrical wiring for flip-chip mounting a device can be formed. When an optical device is mounted in the vicinity of the plated structure and the resin core layer is then removed from the above substrate, the core layer with the plated structure encased therein can be obtained. Therefore, an optical waveguide apparatus with the plated structure (for example, the optical-path converting unit such as a metal mirror) encased at a desired location can be accomplished by simple processing at a relatively low cost.

Where a single two-dimensional slab waveguide is used, signal multiplexing is basically performed using time sharing, i.e., parallel-serial conversion. However, when a line-shaped waveguide (linear waveguide) or a thin bar-shaped waveguide for performing lateral spatial division is provided in the two-dimensional slab waveguide, parallel transmission with independent channels can be employed only for necessary lines.

When electrical wires are further formed on the optical sheet and the optical sheet has a bendable, flexible structure, a portion of the electrical wiring in an electrical board with large scale integration (LSI) or the like mounted thereon can be replaced by the optical wiring of the optical waveguide apparatus of the present invention. Accordingly, the EMI problem can be overcome by such an optoelectrical mixture apparatus at a relatively low cost without any extensive design alterations.

Further, when a plurality of signal interconnections are to be simultaneously executed, a plurality of layered optical waveguide apparatuses need only to be integrated with the electrical circuit board. Here, the electrical interconnection for driving the optical device can be constructed by mounting the optical device and the optical-path converting unit on the optical sheet and forming the via filled with a conductor in the stacked optical sheets. Thus, a multi-layer optoelectrical mixture wiring apparatus can be achieved at a relatively low cost.

These advantages, as well as others, will be more readily understood in connection with the following detailed description of the preferred embodiments and examples of the invention in connection with the drawings.

DESCRIPTION OF THE PREFERRED EMBODIMENTS

Embodiments of an optical waveguide apparatus of the present invention will be described with reference to FIGS. 2 through 13.

Figure 1:
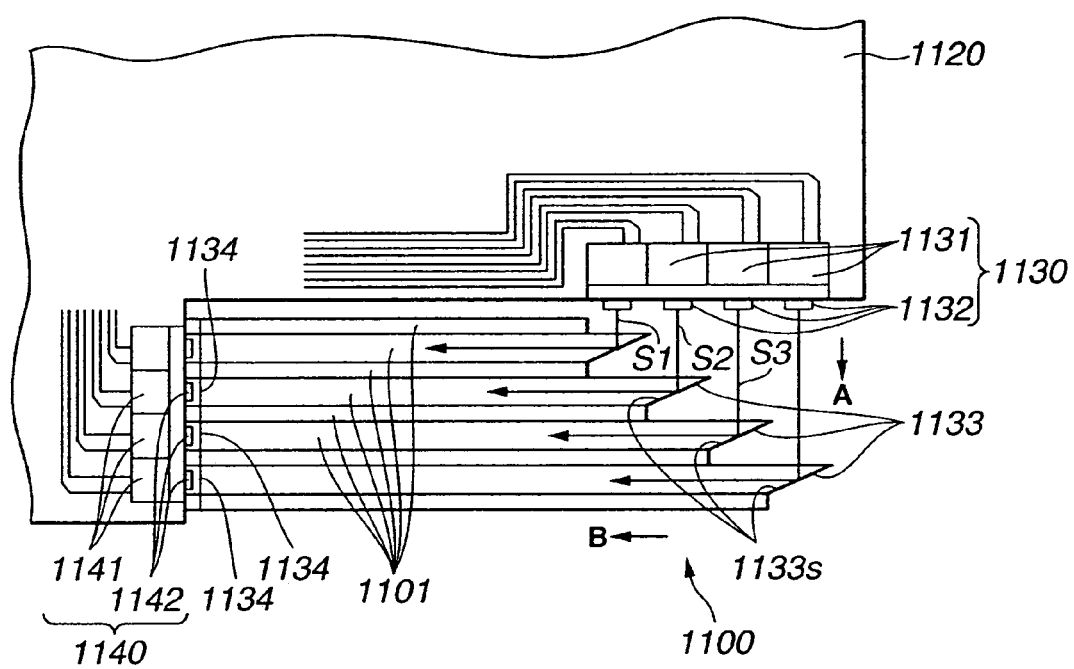
FIG. 1 is a view illustrating a conventional optical waveguide apparatus using a two-dimensional optical sheet.
Figure 2:
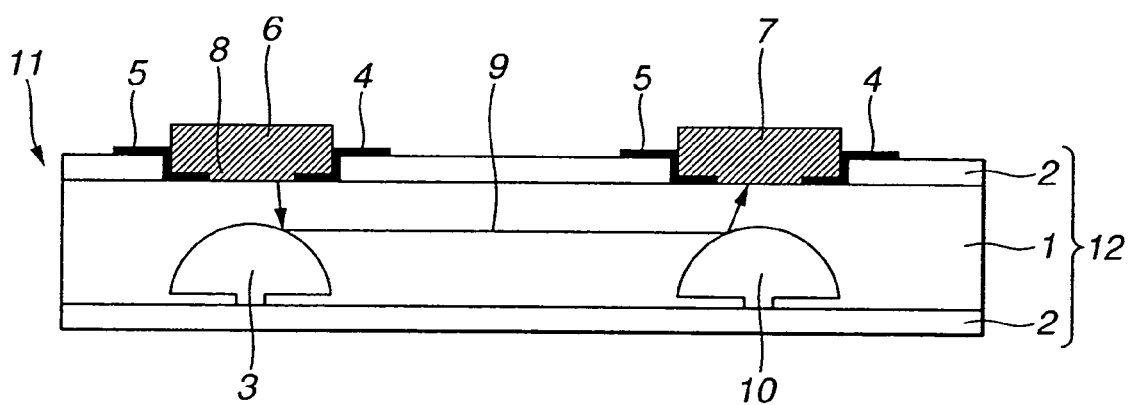
FIG. 2 is a cross-sectional view illustrating a first embodiment of an optical waveguide apparatus according to the present invention.

FIG. 2 illustrates a portion of an optical waveguide apparatus 11 of a first embodiment according to the present invention. An optical sheet 12 is formed of a transparent polymer for the convenience of easy formation. In the optical sheet 12, a core layer 1 of a relatively large refractive index is sandwiched by upper and lower cladding layers 2 of a relatively low refractive index. The entire thickness of the optical sheet is about several hundred microns. A bendable and flexible two-dimensional sheet 12 is thus constructed. In this embodiment, the core layer 1 having a thickness of 100 microns is formed of, for example, a polycarbonate Z (PCZ) of a refractive index 1.59. Each cladding layer 2 having a thickness of 100 microns is formed, for example, of ARTON (name of product by AsahiKasei Kogyo Com.) of a refractive index 1.53. A light-absorbing portion, a roughed portion for scattering light, a tapering portion, or an antireflective coating is preferably formed on each end face of the optical sheet 12 such that light can be prevented from reflecting at the end face and adversely influencing optical devices.

As a light source, a surface light-emitting device 6, such as an LED and a surface-emitting laser, is provided. A guide hole 8 for fitting the light-emitting device 6 therein is formed in the optical sheet. The shape of the guide hole 8 corresponds to the outer profile of the device 6 such that the device 6 can be guided in the hole 8 in a self-aligning manner. Metal wires are further formed on the optical sheet, and the end of each wire extends into the guide hole 8 such that electrodes 4 and 5 of the light emitting device 6 can be brought into contact with the ends of the metal wires when the device 6 is set in the hole 8. The surface light-emitting device 6 can be, for example, a vertical cavity surface-emitting laser (VCSEL) in which a GaAs/AlGaAs MQW (multi-quantum well) active layer, a spacer layer of a one-wavelength cavity, a pair of AlAs/AlGaAs DBR (distributed Bragg reflector) mirrors sandwiching the active layer are grown on a GaAs substrate using a crystal growth method such as MOCVD.

An approximately semispherical plated structure 3 for converting an optical path is formed at a location of the core layer 1 under the surface light-emitting device 6. When the light-emitting device 6 is set in the guide hole 8, the device 6 is aligned with the plated structure 3 such that light emitted from the device 6 can enter the optical sheet 12 through the plated structure 3. In this embodiment, a radiation center of the light-emitting device 6 is aligned right above the top of the semispherical plated structure 3 to transmit light from the light-emitting device 6 in all directions in the optical sheet 12 of the two-dimensional slab waveguide.

A portion of light coupled to the optical sheet 12 propagates as a light beam 9, as illustrated in FIG. 2, and is reflected upward by another plated structure 10 for converting an optical path disposed under a light-receiving device 7 to be received thereby. The light-receiving device 7 is arranged in another guide hole 8. In the event the plate structure 10 also has an approximately semispherical shape, light propagating from any direction in the optical sheet can be reflected upward by the plated structure 10 to be received by the light-receiving device 7 (e.g., photo-detector). The light-receiving device 7 can, for example, be a Si PIN photodiode (PD).

In FIG. 2, portions of the devices 6 and 7 mounted in the holes 8 slightly project from the surface of the optical sheet 12, but those devices can be completely encased in the optical sheet when thickness of the optical device and depth of the guide hole 8 are appropriately regulated.

Figure 3:
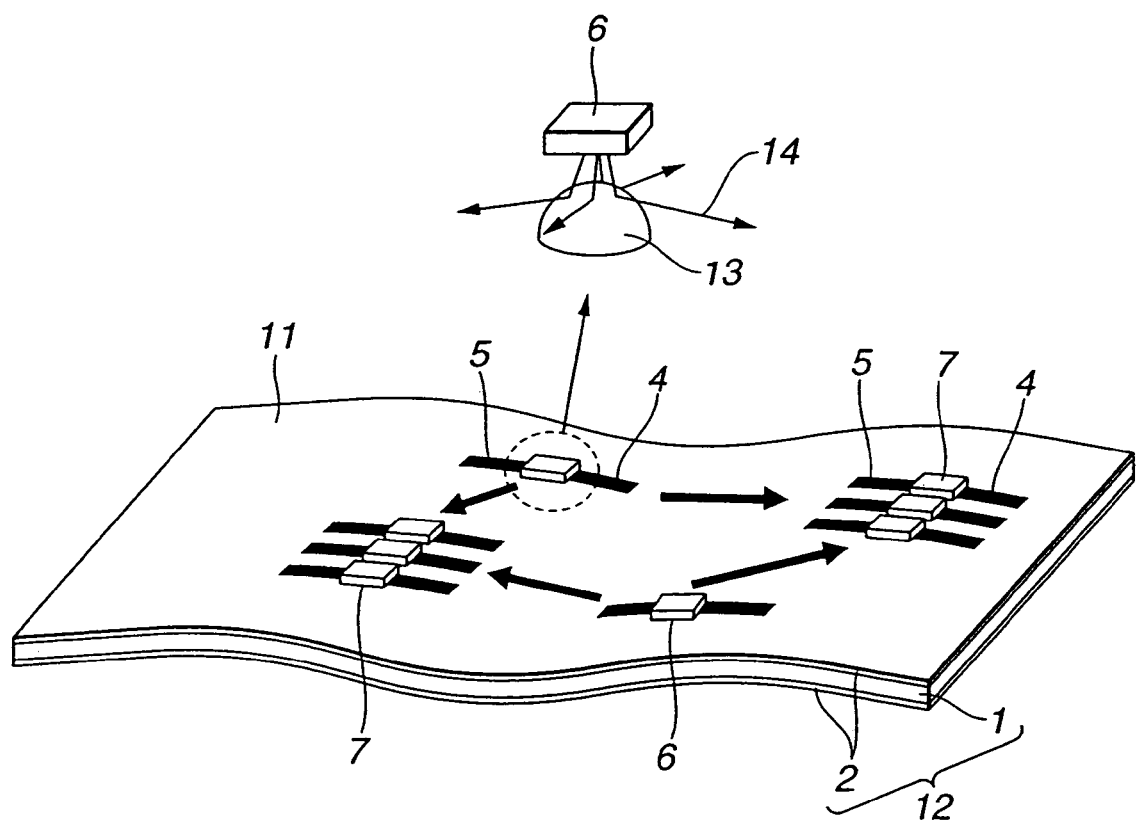
FIG. 3 is a perspective view illustrating the first embodiment.

FIG. 3 illustrates the entire structure of the optical waveguide apparatus 11. Portions having the same functions as those in FIG. 2 are denoted by the same reference numerals. Light-emitting device 6, light-receiving device 7, and plated structure 3 for converting an optical path are arranged at desired positions in the optical waveguide apparatus 11. In this embodiment, since a two-dimensional slab waveguide is used as the optical sheet 12 as discussed above, light 14 from the light-emitting device 6 can be transmitted in all directions in the optical sheet 12. The light 14 can be received by the light-receiving device 7 located at any desired place.

This embodiment, however, cannot be applied to simultaneous transmission of multiple bits. In this case, parallel signals need to be converted into a serial signal. Nevertheless, a highly-functional optoelectrical mixture substrate can be obtained by constructing an appropriate circuit design for replacing some signal lines, which require a solution of the EMI problem, with the optical sheet 12. In FIG. 3, an example of an arrangement of plural optical devices is illustrated.

Figure 4A:
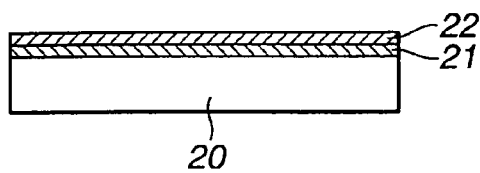
FIG. 4A through 4G are cross-sectional views illustrating a method for making the first embodiment.
Figure 4B:
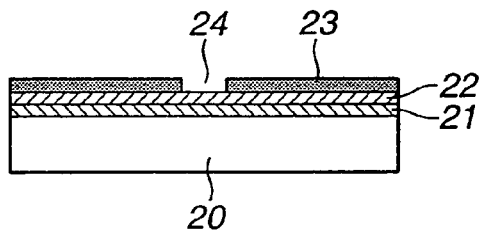
Figure 4C:
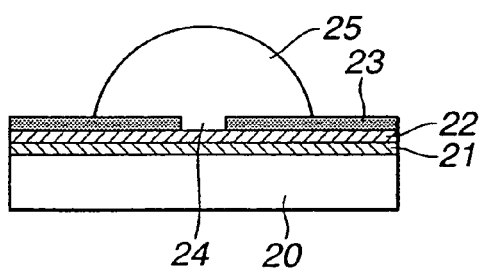
Figure 4D:
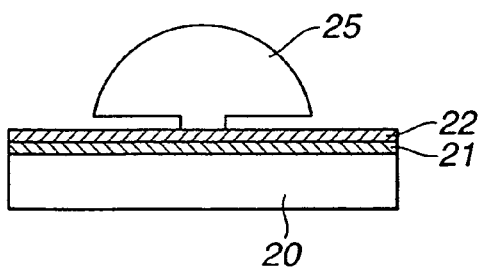

A fabrication method of the optical waveguide apparatus of the first embodiment will be described with reference to FIGS. 4A through 4G. Initially, Cr layer 21 and Au layer 22 are vacuum-evaporated on a glass substrate 20 as an entire electrode for electroplating. The glass substrate can be replaced by a substrate made of Si, ceramics, resin, or the like. A photoresist 23 is patterned by photolithography to form an electrode-exposing window 24 at any desired location at which a plated structure for converting an optical path is to be provided, as illustrated in FIG. 4B. The diameter of the window 24 is in a range from 5 microns to 10 microns. As illustrated in FIG. 4C, an approximately semispherical structure 25 is grown when plating is conducted until plating thickness exceeds the thickness of the resist 23. Here, Ni electroplating is performed, and the semispherical plated structure 25 is formed with a diameter of 160 microns, i.e., a thickness of 80 microns which is slightly thinner than the thickness (100 microns) of a core layer 26 of the optical sheet described later. This thickness can be desirably set by controlling the plating time, etc., so as to be at an optimum level for the optical sheet and the type of a light-emitting device and a light-receiving device. A frame can be formed around the window 24, as illustrated in FIG. 7 (a frame 63 in a second embodiment described later), such that the plated structure can further rise upward.

Plating can be performed using other metal, such as Cu, Cr, Au, or chemical compounds. A multi-layer plated structure of different materials can likewise be adopted. Further, the plated structure can also be formed by electroless plating. In a step shown in FIG. 4D, when the resist 23 is removed, the 160-micron semispherical structure 25 with a 10-micron butt end portion can be obtained. While any desired number of such semispherical structures 25 can be formed at any desired location, if necessary, a desired number of structures 25 can be removed by flicking or using an adhesive tape. In such a method, semispherical structures can be arranged in various patterns even when the same mask for photoresist patterning is used.

Figure 4E:
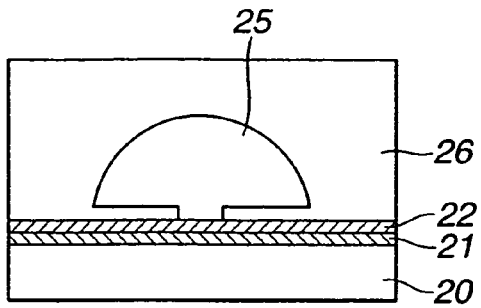
Figure 4F:
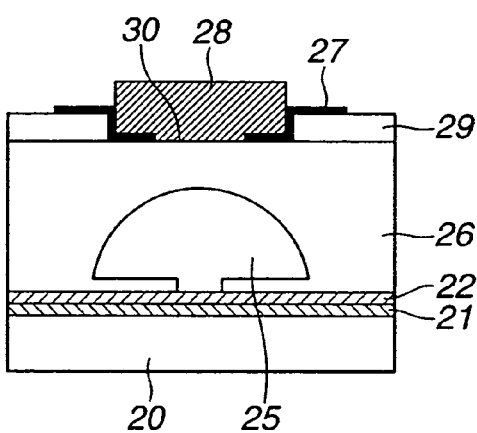

A polymer core layer 26 is formed by dipping, molding, coating, or the like so as to cover the semispherical structure 25, as illustrated in FIG. 4E. Then, as illustrated in FIG. 4F, a cladding layer 29 with a refractive index lower than that of the core layer 26 is formed on the surface of the core layer 26, and electrical wire 27 and hole 30 for mounting an optical device are formed. Here, an ARTON sheet is bonded on the surface of the core layer 2.6. Holes are formed at locations of this sheet at which devices are to be mounted, using excimer laser processing. These holes can also be formed by directing patterning photosensitive optical resin, such as SU-8 (product name), or BCB. In the case of BCB having a relatively high refractive index, it is formed only at a place near the hole for mounting an optical device. Alternatively, the cladding layer 29 can be omitted. In this case, the hole 30 is formed by controlling its depth by laser processing. Further, the hole can also be omitted. In this case, the optical device is mounted at a desired location and the alignment is performed by the flip-chip bonding apparatus.

Electrodes and electrical wires 27 are metal wires made of aluminum, copper, or the like. These wires can be formed by forming a wiring pattern of Al, Cu, Ag, Au or the like using vacuum evaporation and lithography. The electrical wires 27 can also be formed in the following manner. A conductive paste of Cu, Ag, Au or the like is printed on the substrate by a screen printing method to form a circuit conductor pattern, and the circuit conductor is then formed by sintering or hardening the conductive paste. Alternatively, a metal foil, such as an electrolytic copper foil, is deposited and chemically etched using an etching resist with a desired pattern to form the circuit conductor pattern. Further, the interconnection can be formed with a conductive polymer that has a thermal expansion coefficient and an elastic constant sufficiently matching those of the polymer waveguide.

Figure 4G:
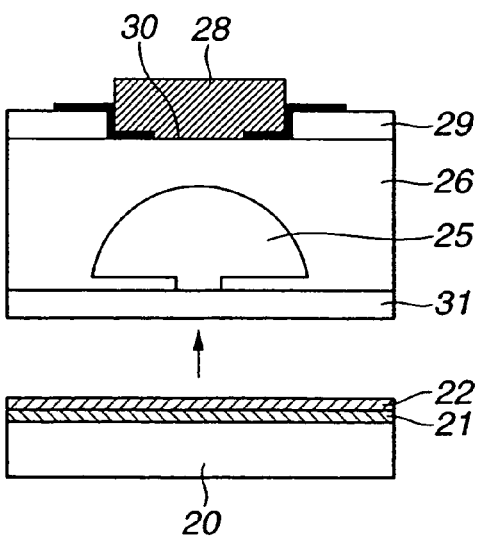

In mounting the light emitting or light-receiving device 28, the device can be flip-chip bonded on the optical sheet and brought into contact with the electrode 27 as follows. An Ag paste or a cream solder is coated on a predetermined location by printing or using a dispenser. The device 28 is inserted into the guide hole 30 and heated to a temperature of about 120° C. In FIG. 4G, when the optical sheet is removed from the substrate 20 by ultrasonic processing and the like, plural encased semispherical plated structures 25 are collectively lifted off and taken in the optical sheet. If necessary, a lower cladding layer 31 is further formed.

Figure 5:
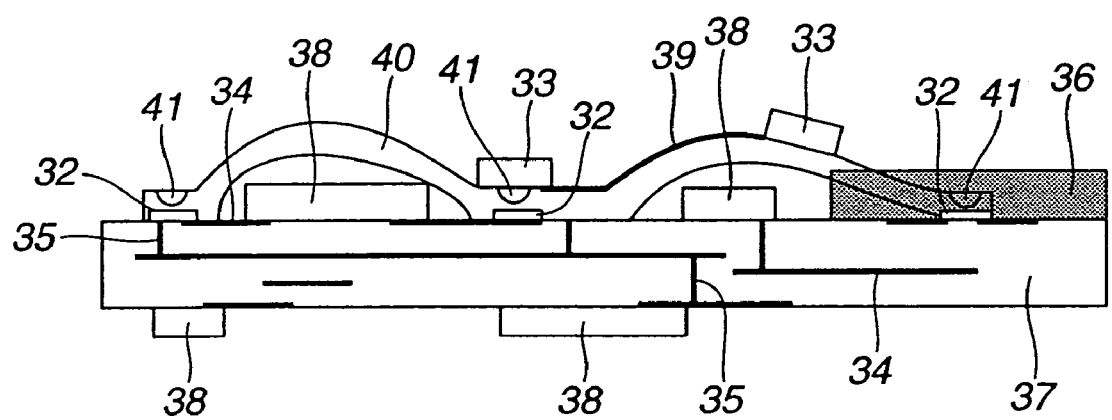
FIG. 5 is a cross-sectional view illustrating an embodiment of an optoelectrical mixture wiring substrate in which the optical waveguide apparatus of the first embodiment is mounted on an electrical circuit.

FIG. 5 illustrates a structure in which the above-discussed optical waveguide sheet with a plated structure 41 is used on an electrical circuit board or substrate. A cross-section of an electrical circuit board 37 in a small portable piece of equipment, such as a cellular phone, is shown in FIG. 5. In this embodiment, an optical waveguide apparatus 40 is made thin and flexible, so that it can be approximately tightly mounted on LSIs 38 provided on the electrical circuit board 37 with an RF circuit 36, electrical wires 34 and vias 35, similar to a flexible printed circuit (FPC). In such an arrangement, an additional interconnection can be formed without a design alteration of the electrical circuit board 37, and EMC (electromagnetic compatibility) can be achieved at a relatively low cost. The electrical wiring on the above-discussed optical waveguide apparatus 40 is aligned with and directly flip-chip bonded on the electrical wiring 34 in the electrical circuit board 37 in the portable equipment. Thus, an optoelectrical mixture wiring substrate can be readily constructed.

The electrical circuit board 37 has a multi-layer built-up structure, and electrical wires 34 and via holes 35 are highly densely formed therein. An RF circuit portion 36 for wireless communication is covered with a shield cover to prevent the electromagnetic interference. Conventionally, when the signal line is drawn out from the RF circuit portion, an antenna is likely to be created depending on the length of the signal line. Hence, due to the common-mode noise radiation, a malfunction of the circuit is caused, requiring a considerable amount of time to satisfy the regulations prescribed by the Radio Law. In this construction, since the signal interconnection is established using the above-discussed optical waveguide apparatus 40, no antenna is formed and unwanted radiation can be vastly reduced.

An optical device 32 is in contact with electrodes on the substrate 37. An electrical wiring 39 and an electrical device chip 33 can also be mounted on the optical sheet, if necessary. In this case, the optical sheet can be an optoelectrical mixture wiring substrate by itself. In the above discussion, the optical waveguide sheet is a flexible wiring substrate. However, a core layer having a thickness of about 1 mm can be injection-molded, and the optical sheet can be constructed as a rigid substrate.

Figure 6:
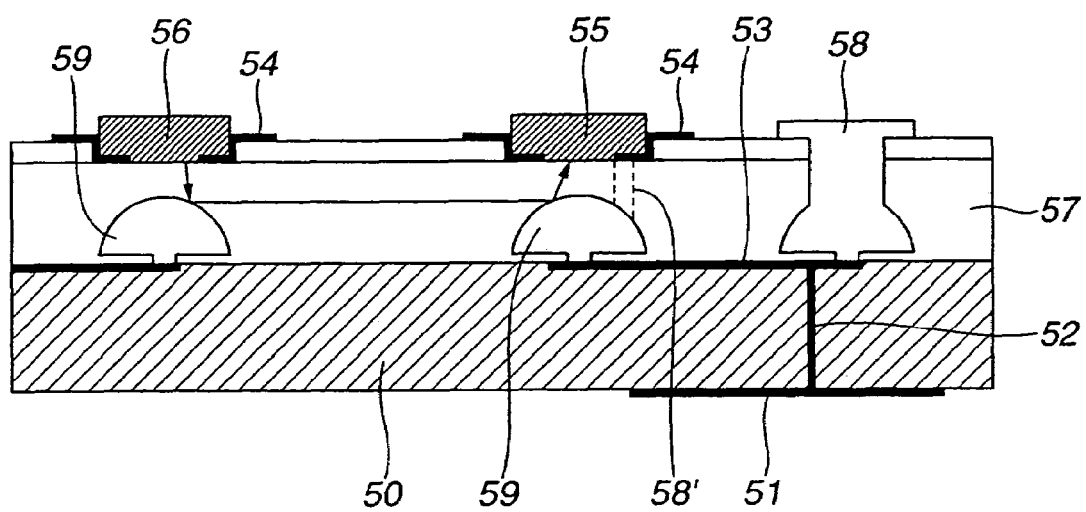
FIG. 6 is a cross-sectional view illustrating a second embodiment of an optical waveguide apparatus according to the present invention.

FIG. 6 is a cross-sectional view illustrating a second embodiment. In the second embodiment, an optical sheet is made by forming a plated structure directly on an electrical circuit substrate, while in the first embodiment, the optical waveguide apparatus is made by encasing the plated structure in the core layer and then removing the substrate.

In the second embodiment, a plated structure 59 for converting an optical path is formed by plating on the surface of an electrical circuit substrate 50 including electrical wires 51 and 53 and via wiring 52, similar to the first embodiment. The electrical circuit substrate 50 can be formed of glass epoxy, polyimide, ceramics, or the like, which can be used for an ordinary substrate. An optical layer 57 of a transparent polymer, such as PCZ, is formed on the circuit substrate 50, similar to the first embodiment. The optical interconnection is established when optical information from a light-emitting device 56 connected to an electrode 54 is transmitted through the optical layer 57 and the plated structures 59, and detected by a light-receiving device 55 connected to another electrode 54.

A plated structure 58 can be used as a via wiring penetrating the optical layer 57. Further, a plated structure 58' can serve as both an optical-path converting unit and a via penetrating the optical sheet 57.

Figure 7A:
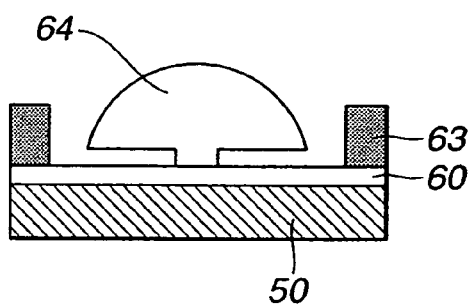
FIG. 7A through 7E are cross-sectional views illustrating a method for making the second embodiment.
Figure 7D:
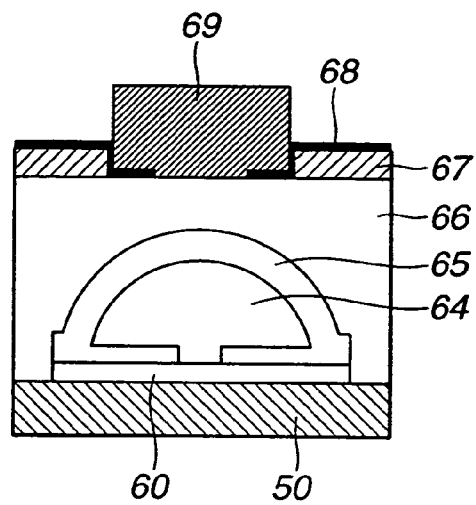
Figure 7B:
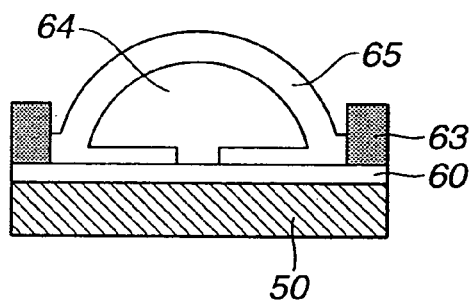

A method for making the second embodiment will be described with reference to FIGS. 7A through 7E. Initially, as illustrated in FIG. 7A, an approximately semispherical plated structure 64 is formed, by a method as discussed in the first embodiment, on the electrical circuit substrate 50. Here, electrical wires other than those on the surface are formed on the substrate 50, and an entire electrode 60 of Cu or the like is formed on the side of the substrate 50 on which the optical sheet is to be formed. Further, a photoresist 63 is patterned to form a window with a diameter (here 200 microns) slightly larger than that of the plated structure 64. Then, as illustrated in FIG. 7B, a layer 65 is further plated on the plated structure 64 such that a thin butt portion of the plated structure 64 can be reinforced. The plated layer 65 is appropriately shaped by the photoresist with the window. The plated structure 64 thus becomes hard to collapse. In a step of FIG. 7C, patterning of the electrode is performed after the resist 63 is removed. Thus, as indicated by reference numeral 53 in FIG. 6, the electrode wiring for forming the circuit can also be formed on the surface on which the plated structure is formed.

Figure 7E:
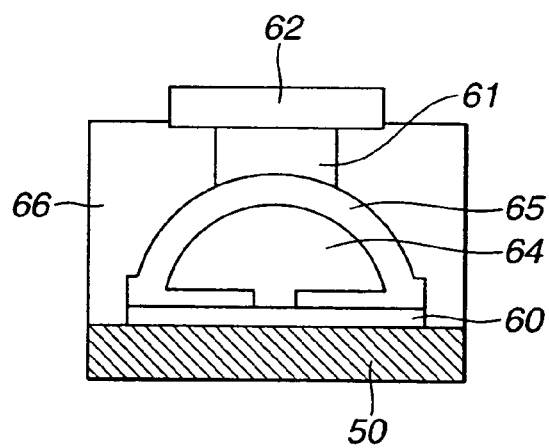
Figure 7C:
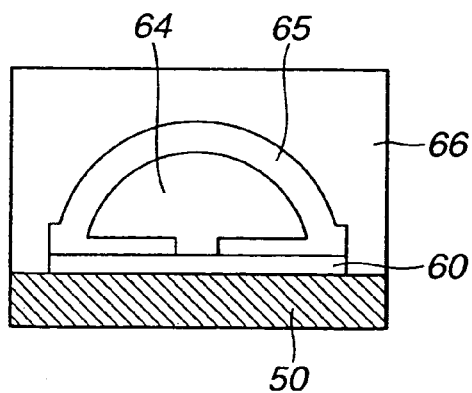

After the electrical wiring is completed, an optical waveguide layer 66 of optical polymer is formed by dipping, molding, coating, or the like so as to encase the semispherical structure 64 and 65 therein. Then, as illustrated in FIG. 7D, an optical device 69 is mounted in a hole with an electrode wiring 68, which is formed in a cladding layer 67 by a method similar to that in the first embodiment. As previously described, a hole can be formed by laser processing at a location at which the via wiring is to be formed, and penetrating the electrode 61 and the electrode pad 62 can be formed therein, as illustrated in FIG. 7E. In forming this hole, selective processing can be performed by controlling radiation energy density when excimer laser processing is employed. Thus, only layer 66 can be bored without damaging the semispherical metal structures 64 and 65.

Figure 8:
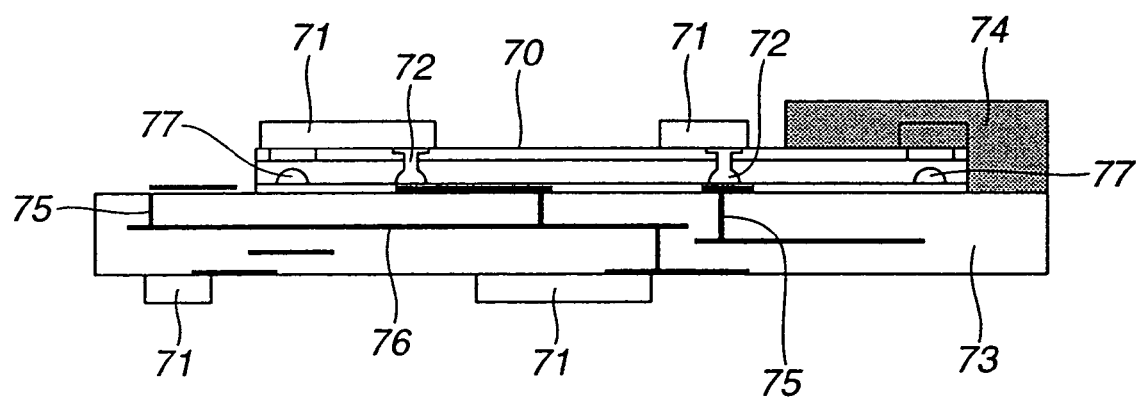
FIG. 8 is a cross-sectional view illustrating an embodiment of an optoelectrical mixture wiring substrate in which the optical waveguide apparatus of the second embodiment is mounted on an electrical circuit.

FIG. 8 illustrates a structure in which the above-discussed mixture board with an optical waveguide apparatus and an electrical circuit substrate is applied to a portable piece of equipment. In the structure of FIG. 8, an optical waveguide layer 77 with an optical path converting structure 77 and via wiring 72 formed by the above direct plating is formed on a necessary region of an electrical circuit substrate 73 having an electrical wiring 76 and via wiring 75. On an optical waveguide apparatus 70, electrodes for driving an optical device are formed and ICs 71 are mounted so as to be in contact with the penetrating via 72 from the substrate 73. In this structure, an RF portion 74 is further arranged.

The EMC design becomes important for compact, portable equipment if plural high-speed systems with different frequencies, such as IEEE 802.11a (5-GHz band to 54 Mbps), Bluetooth (2.4 GHz to 1 Mbps), and 4th-generation cellular phones (5-GHz band to 100 Mbps), are involved. The above-discussed optoelectrical mixture substrate with the integrated optical sheet of this embodiment can increase flexibility of such a design and reduce the cost.

Figure 9A:
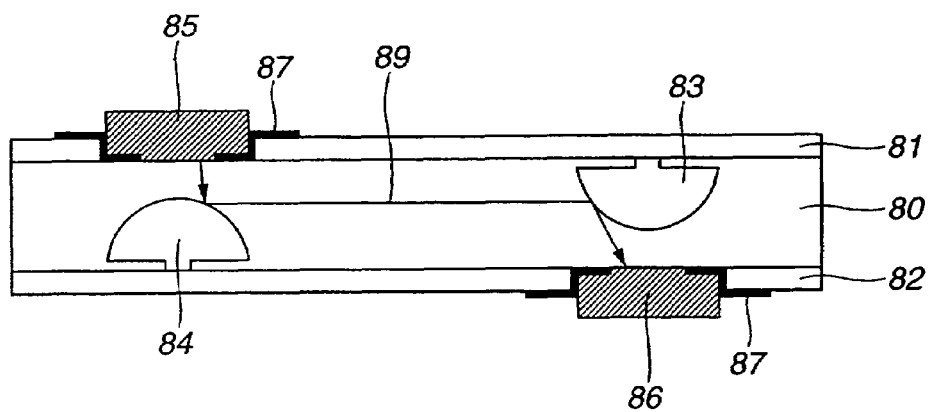
FIGS. 9A through 9C are cross-sectional views illustrating a third embodiment of an optical waveguide apparatus according to the present invention.

FIG. 9A is a cross-sectional view illustrating a third embodiment of the present invention. In the third embodiment, an optical waveguide apparatus is made using both opposite surfaces of an optical sheet, as illustrated in FIG. 9A, while in the above embodiments the plated structure or the optical device is arranged only on one surface of the optical sheet. In making the third embodiment, two substrates, each having a plated structure on its surface, are prepared. A transparent polymer solution is coated on the surface of one substrate. The substrate is stacked and aligned with the first substrate (using an alignment marker, for example) before the polymer solution is dried. The two substrates are then removed after the transparent polymer is dried. The thickness of a core layer 80 of the optical sheet can be appropriately adjusted when the two substrates are stacked. After the two substrates are removed, cladding layers 81 and 82, holes for mounting an optical device, and electrode wires 87 are formed, and optical devices 85 and 86 are arranged in the holes as described in the above embodiments.

In the structure of FIG. 9A, light emitted from the light-emitting device 85 is optically coupled to the core layer 80 by a plated structure 84 for converting an optical path to form a light beam 89 propagating in the optical sheet, and a portion of the light beam 89 is reflected by another plated structure 83 and is detected by the light-receiving device 86. In this embodiment, the above-discussed via wiring can be formed by putting together and aligning the two substrates with plated structures formed on their surfaces.

Figure 9B:
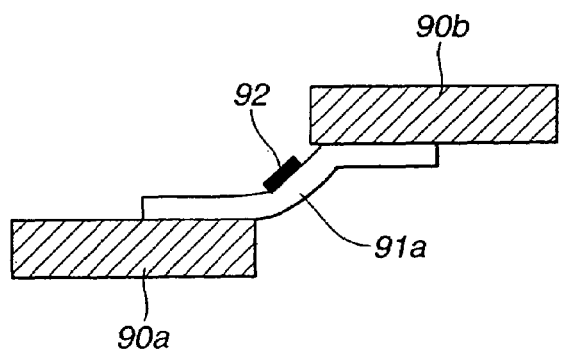
Figure 9C:
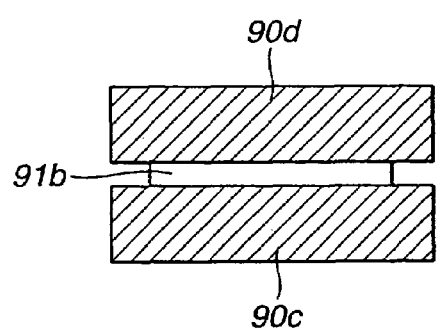

Using the above structure, plural electrical circuit boards 90a and 90b can be connected through cables formed by an optical waveguide apparatus 91a, as illustrated in FIG. 9B. Alternatively, an optical waveguide apparatus 91b can be sandwiched by electrical circuit boards 90c and 90d, as illustrated in FIG. 9C. An EMI-free transmission medium for connecting boards at high speed can be thus accomplished. Since this structure is an optical interconnection, it can electrically isolate plural substrates. As illustrated in FIG. 9B, an IC 92 can be mounted directly on the optical waveguide apparatus 91a along the optical interconnection.

In the above embodiments, the resist mask for plating has a circular opening for forming an approximately semispherical plated structure, and light emission and reception in the two-dimensional slab waveguide are conducted with respect to all directions in the optical sheet.

In many actual cases, however, light need only propagate in a certain predetermined direction from the standpoint of the wiring architecture. Also, in cases of bus wiring, it is desirable from the viewpoint of effective use of optical power to transmit light in a predetermined direction and output the light. In other words, when light is transmitted in a two-dimensional manner and reaches a position at a distance of R (mm), its optical power receivable per 1-mm arc attenuates by $10*\log(1/2\pi R)+R*\alpha$ (dB), where $\alpha$ is the propagation loss in the optical sheet (dB/mm). Accordingly, when light propagates 20 mm and is detected by a detector with a diameter of 1 mm, its loss is 21 dB even if $\alpha$ is neglected. Hence, directive transmission is often advantageous in power consumption and cost in cases other than one-to-multiplicity transmission, such as transmission of clock signals.

Figure 10A:
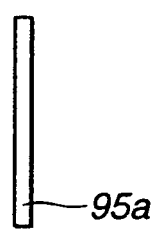
FIGS. 10A and 10B are plan views illustrating electrode-exposing windows used in making a fourth embodiment of an optical waveguide apparatus according to the present invention.
Figure 10B:
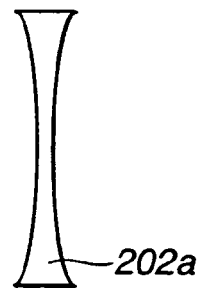
Figure 11:
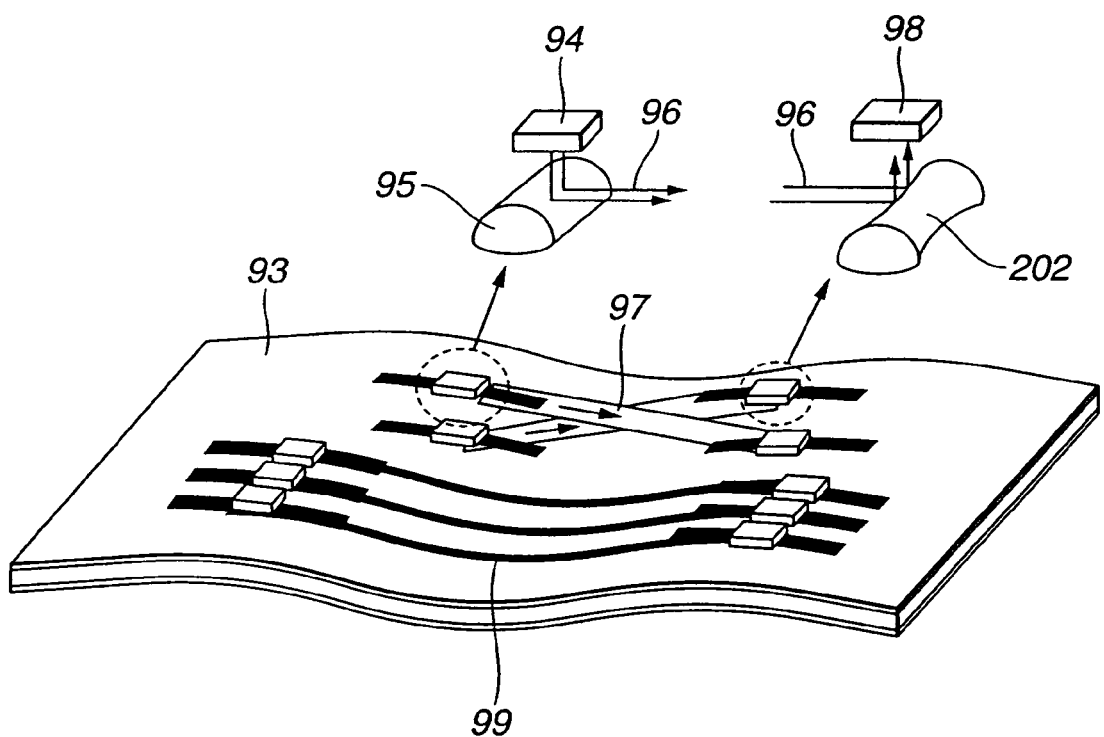
FIG. 11 is a perspective view illustrating the fourth embodiment according to the present invention.

In a fourth embodiment, a mask pattern with an elongated slit-like opening 95a, as illustrated in FIG. 10A, or with elongated slit-like opening 202a having concave portions, as illustrated in FIG. 10B, is used for plating to produce an optical-path converting plated structure that creates a directivity in light propagation in an optical sheet 93, as illustrated in FIG. 11.

For example, when plating is performed to a thickness of 80 microns using a mask with a 5 μm×50 μm slit-like opening 95a, a horizontal semicylindrical plated structure 95 with rounded ends can be formed as illustrated in FIG. 11. When this plated structure 95 is used with a radiation center of a light-emitting device 94 slightly shifted from a top of the plated structure 95, all light travels in a direction 96 and a light beam with a beam pattern 97 can be created. On the other hand, when plating is performed using a mask with a 20 μm×100 μm slit-like opening 202a with a 2-micron central width, a horizontal semicylindrical plated structure 202 with a central concave mirror can be formed, as illustrated in FIG. 11. This plated structure 202 capable of condensing transmitted light is advantageous in optical coupling to a light-receiving device 98. When the plated structure 202 with the concave mirror is employed on the side of the light-emitting device 94, light from the device 94 can be transmitted as a parallel beam. Accordingly, directive transmission can be achieved thereby in the slab waveguide 93 without using a line-shaped waveguide, such as a waveguide 99 illustrated in FIG. 11. Thus, this structure makes it possible to perform simultaneous transmission of multiple bits in a spatial multiplexing manner along a single slab waveguide 93. In this case, crossing wiring, as illustrated in FIG. 11, can also be performed.

Actually, where interconnections are close to each other, i.e., the inter-wiring distance is less than several tens microns, there is a possibility of cross-talk. Accordingly, the line waveguide 99 can be jointly used in the optical sheet.

The line waveguide 99 can be formed, for example, as follows. In the case of polycarbonate Z, monochlorobenzene mixed with monomer is coated, and the coated material is then exposed to radiation through a photo mask having a pattern, as illustrated in FIG. 11. Polymerization occurs only in the exposed region, and the refractive index increases only in a polymerized portion to form the line waveguides 99. The line waveguide 99 can also be formed by a method in which a heated mold is pressed against the optical sheet to form a protruded line of the line waveguide 99.

The fourth embodiment can achieve an optical wiring apparatus in which directive transmission can be jointly performed in the two-dimensional optical sheet 93 with less power loss.

Figure 12:
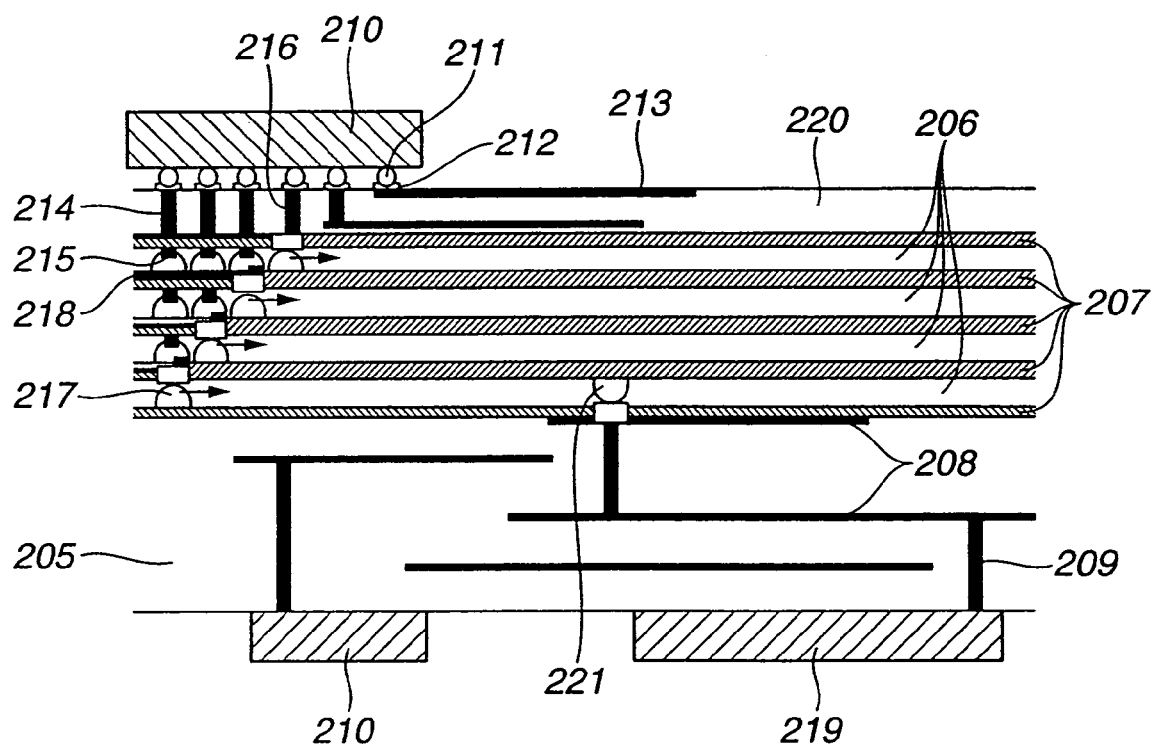
FIG. 12 is a cross-sectional view illustrating another embodiment of an optoelectrical mixture wiring substrate in which plural optical waveguide apparatuses and electrical circuits are stacked.

FIG. 12 illustrates a fifth embodiment having a multi-layer structure in contrast to a single-layer optical sheet in the above embodiments. In the multi-layer structure, simultaneous optical interconnection of multiple bits is possible.

As illustrated in FIG. 12, a via wiring 209 and electrical wiring 208 are formed in a multi-layer electrical circuit board or substrate 205, and an LSI 210 and a passive device 219 are mounted on the surface of the board 205.

In the fifth embodiment, an optical waveguide apparatus of the present invention is bonded to the electrical circuit board 205, and disposed below a substrate 220 on which the LSI 210 is mounted. The LSI 210 packaged by micro BGA (ball grid array) and the like is mounted so as to be connected to pads 212 with solder balls 211. A portion of its terminals is connected to a light-emitting device 216 in the optical waveguide apparatus through a via 214 to drive the device. Another electrode of the light-emitting device 216 is connected to a common electrode (ground, or power source voltage) through an electrical wire 218 formed in a cladding layer 207. The electrical wire 218 also has divides optical waveguide layers 206 and shields light. In such a structure, an electrical signal from the LSI 210 is converted into an optical signal by the light-emitting device 216, and the optical signal is reflected by an optical-path converting plated structure 217 and transmitted in a direction indicated by the arrow in the optical waveguide layer 206.

The optical waveguide apparatus of this embodiment has a four-layer structure, but it is not limited thereto. As a wiring to an optical device in a lower layer, a via 215, such as the via 58 illustrated in FIG. 6, penetrating the optical sheet, can be used. Therefore, a connection to the lowest optical device is conducted through three sets of plated structures 217 and vias 215. It is possible that only high-speed signals of the LSI 210 are transmitted through the above optical interconnection and a portion of signals of the LSI 210 is transmitted through an electrical wire 213, as illustrated in FIG. 12.

FIG. 12 illustrates the structure on a light-transmitting side. The structure on a light-receiving side can also be constructed in the same manner. Further, a portion of the signals can be extended toward the lower electrical circuit substrate 205 by an optical-path converting plated structure 221, using the structure in the third embodiment of FIG. 9A. The above-discussed construction can function as a high-speed serial bus, which is usable for an internal connection, or as a connection to peripheral equipment, such as storing apparatuses or visual instruments, in the next-generation PC (personal computer) and so forth.

Figure 13:
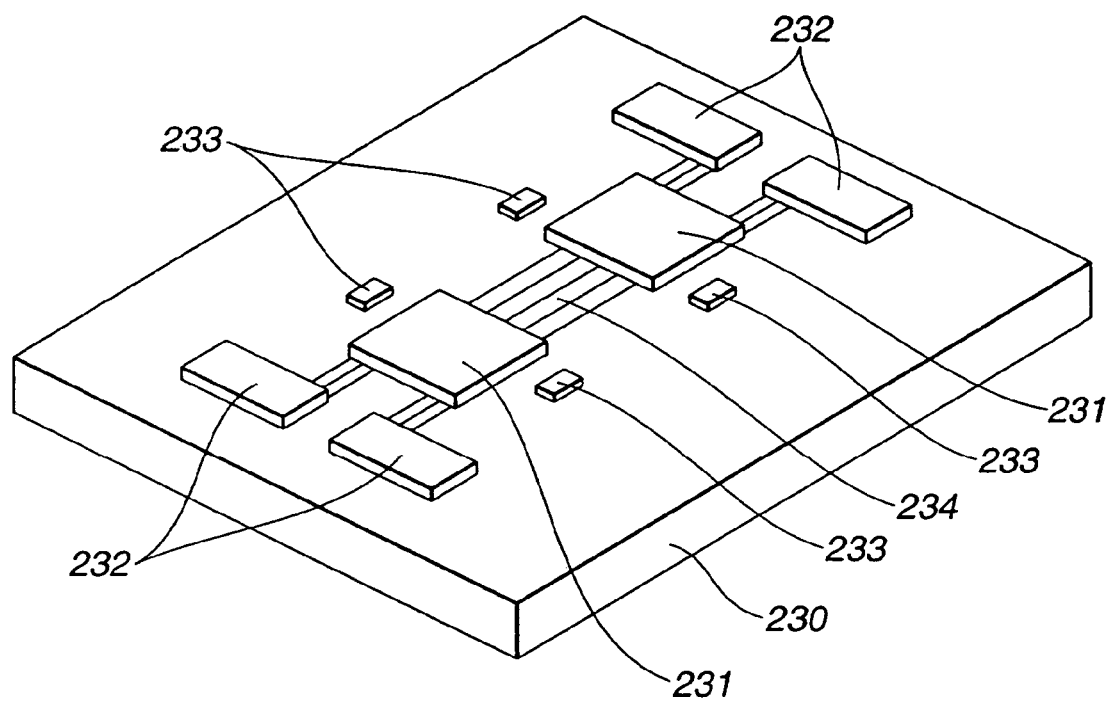
FIG. 13 is a perspective view illustrating still another embodiment of an optoelectrical mixture wiring substrate in which high-speed signal interconnection by multi-layer optical waveguide apparatuses is used.

FIG. 13 illustrates an example of a board in which the high-speed serial bus is built by the above-discussed optical wiring. In the construction of a dual CPU 231, connections between CPUs 231 and between CPU 231 and memory 232 are established using the optical waveguide apparatus of the fifth embodiment. In establishing an optical wiring 234, four layers are vertically stacked as illustrated FIG. 12. At the same time, these four layers are arranged so that they are parallel to each other in an in-plane direction of an electrical substrate 230 to construct a 16(4×4)-bit structure, as illustrated in FIG. 13. Each access between CPU 231 and memory 232 has an 8(4×2)-bit structure. In this construction, electrical chips 233 are further arranged.

When a 64-bit output of the CPU 231 is parallel-serial converted into 16-bit signals and an optical transmission of 10 Gbps per one bit is performed, serial-bus connection with a 2.5 GHz operation per one bit (converted into a 64-bit parallel), i.e., totally 160 Gbps (20 GB/sec) in one channel, can be achieved. Even in such high-speed connections, the EMI noises can be oppressed, and multi-CPU systems, such as direct network connections between plural remote CPUs and between peripheral equipment, can be established. The 16-bit bus width is discussed in the above structure, but the structure is not limited thereto.

In recent built-up substrates using only electrical wiring, there exist the following problems in a transmission wiring for high-speed signals. These problems are cross-talk noises due to proximate wiring, signal degradation due to reflections caused by the impedance mismatching, and electromagnetic radiation noises resulting therefrom. The problems can be solved when the multi-layer optical waveguide apparatus of this embodiment applicable to a built-up substrate is used in a portion of high-speed signal transmission. Further, a high-speed serial transfer is under development as a bus for next-generation high-speed LSI interconnection, and RapidIO (U.S. Motrola, et al.), Hyper Transport (U.S. AMD), 3GI0 (U.S. Intel), and so forth are presently targeting 1 GB/sec at 8 bit-1 GHz. In the event that the next-generation interconnections require more than 10 GB/sec under the same standards, high-speed serial bus using the optical waveguide apparatus of the present invention becomes indispensable even from the viewpoint of electromagnetic radiation noises, board design, and power consumption.

In the fifth embodiment, the optical waveguide apparatus is sandwiched by the electrical circuit boards 205 and 220. However, there can also be provided a structure in which the electrical circuit board is mounted on one side of the optical waveguide apparatus only, or a structure in which optical waveguide apparatuses and electrical circuit boards are alternately stacked.

As described in the foregoing, in the optical waveguide apparatus of the present invention usable to solve the EMI problem and the like, the plated structure can be flexibly arranged at any desired location of the optical sheet at a relatively low cost.

Further, in establishing high-speed multi-CPU systems, super-high-speed bus wiring for increasing flexibility of board designing can be accomplished using the optoelectrical mixture wiring substrate of the present invention.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. A method for making an optical waveguide apparatus, which includes an optical waveguide and an optical path converter provided in the optical waveguide, the method comprising the steps of:

preparing a substrate having a conductor;

forming a first resin material layer on the conductor;

forming a window for exposing a portion of the conductor by removing a portion of the first resin material; and forming the optical path converter made of metal on the window and on the first resin material through the window by electroplating; and forming a second resin material layer as a core layer of the optical waveguide on the optical path converter, wherein the optical path converter has a semispherical shape, horizontal semicylindrical shape, or semicylindrical shape having a concave surface on its recessed portion.

2. The method according to claim 1, further comprising a step of forming a light-emitting device or a light-receiving device on the optical waveguide.

3. The method according to claim 1, wherein the window has a circular shape, an elongated slit shape or an elongated slit shape with a concave portion.

4. The method according to claim 1, wherein the substrate is an electrical circuit substrate, and the optical path converter is formed on the electrical circuit substrate.

* * * * *

UNITED STATES PATENT AND TRADEMARK OFFICE
CERTIFICATE OF CORRECTION

PATENT NO.         : 7,425,286 B2                                      Page 1 of 1
APPLICATION NO.    : 11/246111
DATED              : September 16, 2008
INVENTOR(S)        : Toshihiko Ouchi It is certified that error appears in the above-identified patent and that said Letters Patent is hereby corrected as shown below:

<u>COLUMN 12</u>

Line 25, "in dispensable" should read --indispensable--.

Signed and Sealed this

Tenth Day of February, 2009

JOHN DOLL
*Acting Director of the United States Patent and Trademark Office*